United States Patent
Kim

(10) Patent No.: US 9,112,246 B2
(45) Date of Patent: Aug. 18, 2015

(54) BATTERY PACK INCLUDING BATTERY GAUGE

(75) Inventor: Eunyoung Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 861 days.

(21) Appl. No.: 12/762,638

(22) Filed: Apr. 19, 2010

(65) Prior Publication Data

US 2011/0007501 A1    Jan. 13, 2011

(30) Foreign Application Priority Data

Jul. 13, 2009   (KR) .................. 10-2009-0063745

(51) Int. Cl.
| | |
|---|---|
| H01M 10/48 | (2006.01) |
| F21L 4/02 | (2006.01) |
| H01M 2/04 | (2006.01) |
| H01M 2/18 | (2006.01) |
| H01M 10/42 | (2006.01) |

(52) U.S. Cl.
CPC ............ *H01M 10/48* (2013.01); *H01M 2/0404* (2013.01); *H01M 2/18* (2013.01); *H01M 10/425* (2013.01); *H01M 10/488* (2013.01); *H01M 2200/106* (2013.01)

(58) Field of Classification Search
None
See application file for complete search history.

(56) References Cited

U.S. PATENT DOCUMENTS

| | | | |
|---|---|---|---|
| 4,184,008 A * | 1/1980 | Watakabe | ............... 429/407 |
| 4,876,513 A | 10/1989 | Brilmyer et al. | |
| 5,459,671 A | 10/1995 | Duley | |
| 6,078,496 A * | 6/2000 | Oguchi et al. | ............... 361/679.55 |
| 2004/0164715 A1 | 8/2004 | Nawa et al. | |
| 2007/0054180 A1* | 3/2007 | Miyajima et al. | ............... 429/96 |
| 2009/0027218 A1 | 1/2009 | Yoo | |
| 2009/0108271 A1* | 4/2009 | Chou et al. | ............... 257/88 |

FOREIGN PATENT DOCUMENTS

| | | |
|---|---|---|
| JP | 06044956 | 2/1994 |
| JP | 2002190327 A | 7/2002 |
| JP | 2004192920 A | 7/2004 |
| JP | 2005317406 | 11/2005 |
| JP | 2005317406 A * | 11/2005 |

(Continued)

OTHER PUBLICATIONS

Korean Office Action dated May 11, 2011, corresponding to Korean Patent Application No. 10-2009-0063745, together with Request for Entry.

(Continued)

*Primary Examiner* — Ula C Ruddock
*Assistant Examiner* — Daniel Gatewood
(74) *Attorney, Agent, or Firm* — Robert E. Bushnell, Esq.

(57) ABSTRACT

A battery pack including a battery gauge. The battery gauge includes a circuit board, light emitting devices electrically connected to a battery cell on the circuit board and turned on or off according to a voltage of the battery cell, a display unit disposed outside a pack case at positions corresponding to the light emitting devices, and a partition wall guiding light of the light emitting device to a part of the display unit corresponding to the light emitting device. Since the partition wall prevents light of the light emitting device from affecting the neighboring light emitting device, an on/off operation of the light emitting device is accurately displayed on the display unit, so that a battery discharge level can be accurately detected.

12 Claims, 5 Drawing Sheets

(56) References Cited

FOREIGN PATENT DOCUMENTS

| | | |
|---|---|---|
| JP | 2007073207 | 3/2007 |
| KR | 1020060098169 A | 9/2006 |
| KR | 1020090030818 | 3/2009 |

OTHER PUBLICATIONS

Korean Notice of Allowance issued on Feb. 3, 2012 in connection with Korean Patent Application Serial No. 10-2009-0063745 and Request for Entry of the Accompanying Office Action attached herewith.

* cited by examiner

BATTERY PACK INCLUDING BATTERY GAUGE

CLAIM OF PRIORITY

This application makes reference to, incorporates the same herein, and claims all benefits accruing under 35 U.S.C. §119 from an application earlier filed in the Korean Intellectual Property Office on Jul. 13, 2009 and there duly assigned Serial No. 2009-0063745.

BACKGROUND OF THE INVENTION

1. Field of the Invention

A battery pack including a battery gauge.

2. Description of the Related Art

Portable electronic devices, such as notebook computers, personal digital assistants (PDAs), cellular phones, and digital cameras, receive power from rechargeable battery packs. Since the discharge time of a battery pack is limited, a battery discharge level is displayed through a display of an electronic device. As is well known in the art, a battery discharge level is expressed as a bar shape that is proportional in length to the battery discharge level of a battery pack. Thus, a user is informed of a battery discharge level of a battery pack based on the length of a bar displayed on a display of an electronic device.

However, a battery discharge level of a battery pack can be detected only when the battery pack is installed on an electronic device. That is, when a battery pack is removed from an electronic device or when the electronic device is turned off, it is difficult to detect the battery discharge level of the battery pack.

To address this limitation, a battery gauge including a plurality of light emitting diodes (LEDs) and a display unit is provided to a battery pack to display a battery discharge level corresponding to the number of on-state LEDs even when the battery pack is removed from an electronic device.

The above information disclosed in this Related Art section is only for enhancement of understanding of the background of the invention and therefore it may contain information that does not form the prior art that is already known to a person of ordinary skill in the art.

SUMMARY OF THE INVENTION

One aspect of the present invention is a battery pack including a battery gauge, which substantially overcome one or more of the problems due to the limitations and disadvantages of the related art.

Another aspect of the present invention is a battery pack including a battery gauge, which includes a plurality of light emitting diodes (LEDs) to prevent light from the LEDs from affecting parts of a display unit corresponding to the neighboring off-state LEDs when the LEDs are arranged to display a battery discharge level, so that on/off operations of the LEDs are accurately displayed, thereby accurately displaying a battery discharge level.

Another aspect of the present invention is a battery pack including: at least one rechargeable battery cell; a protective circuit module electrically connected to the battery cell; a pack case accommodating the battery cell and the protective circuit module; and a battery gauge, wherein the battery gauge includes: a circuit board; a plurality of light emitting devices electrically connected to the battery cell on the circuit board and turned on or off according to a voltage of the battery cell; a display unit disposed outside the pack case at positions corresponding to the light emitting devices; and a partition wall guiding light of the light emitting device to a part of the display unit corresponding to the light emitting device.

In the above battery pack including a battery gauge, the partition wall may have an end fixed on the circuit board, and another end protruding to the display unit. In the above battery pack including a battery gauge, the partition wall may have an end fixed on a lower side of the display unit, and another end protruding to the circuit board.

In the above battery pack including a battery gauge, the partition wall may be connected to a neighboring partition wall through a plate to form a single piece. In the above battery pack including a battery gauge, the partition wall may be separated from a neighboring partition wall. In the above battery pack including a battery gauge, the plate may include a through hole.

In the above battery pack including a battery gauge, the partition wall may be disposed between neighboring light emitting devices of the light emitting devices.

In the above battery pack including a battery gauge, the partition wall may be disposed between neighboring light emitting devices of the light emitting devices, and be open in a region without the neighboring light emitting devices. In the above battery pack including a battery gauge, the partition wall may have a cross section that is parallel to the circuit board and that includes one of a straight line, an arc with an open portion, and a polygon with an open portion.

In the above battery pack including a battery gauge, the partition wall may surround the light emitting device. In the above battery pack including a battery gauge, the partition wall may have an open upper surface and an open lower surface. In the above battery pack including a battery gauge, the partition wall may include a guide hole in a lower surface to transmit light from the light emitting device upward. In the above battery pack including a battery gauge, the partition wall may have a cross section that is parallel to the circuit board and that includes one of a circle and a polygon.

In the above battery pack including a battery gauge, the light emitting devices may be fixed in a single row. In the above battery pack including a battery gauge, at least three of the light emitting devices may be fixed at corners of a polygon.

In the above battery pack including a battery gauge, the partition wall may be fixed through one of an adhesive, heat welding, an adhesive tape, and a screw member.

In the above battery pack including a battery gauge, the circuit board may include a switch, and the battery gauge may turn the light emitting device on or off according to a voltage of the battery cell when the switch is turned on. In the above battery pack including a battery gauge, the switch may have an upper end exposed outside the pack case.

In the above battery pack including a battery gauge, the circuit board may be electrically connected to the protective circuit module, so that the circuit board is electrically connected to the battery cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
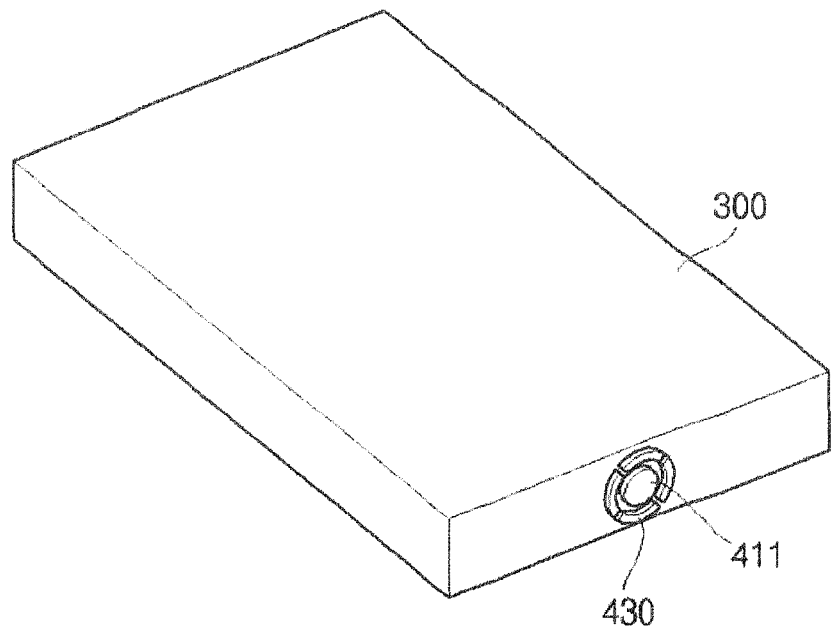
FIG. 1 illustrates a perspective view of a battery pack including a battery gauge according to an embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In a battery pack including a battery gauge, LEDs may be arranged in a predetermined shape. In this case, light emitted from LEDs is scattered laterally, so that light is not only emitted through parts of the display unit corresponding to the "on" LEDs, but also through parts corresponding to "off" LEDs, thus, giving an inaccurate reading on the on/off operation states of the LEDs. In particular, when LEDs are distant from a display unit, the interference of light emitted from the LEDs further deteriorates the displayed on/off operation states of the LEDs. This makes it difficult to accurately perceive a battery discharge level, and thus it is desirable to prevent light from the LEDs from affecting parts of a display unit corresponding to the neighboring off-state LEDs when the LEDs are arranged to display a battery discharge level.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals denote like elements throughout.

Figure 2:
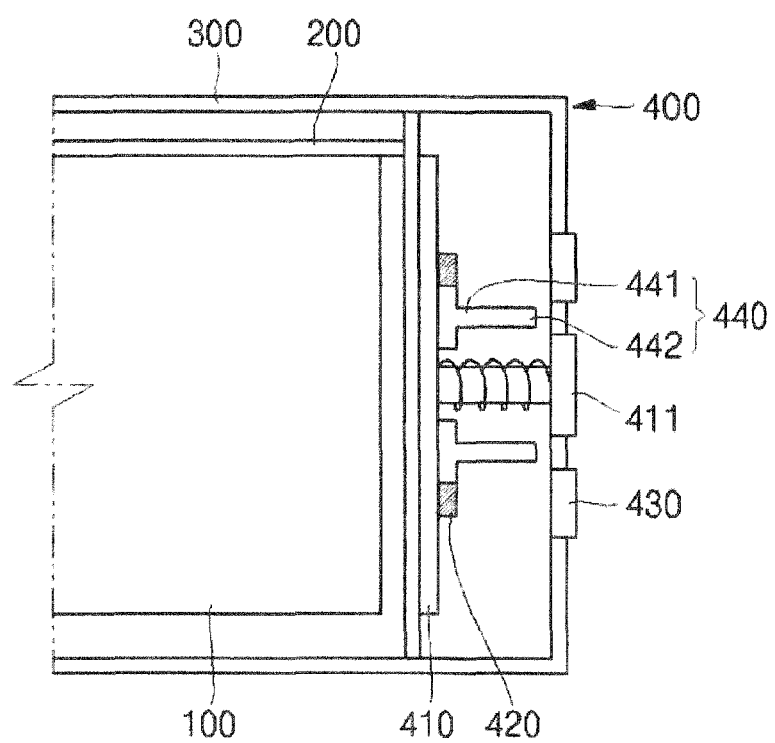
FIG. 2 illustrates a cross-sectional view of a principal part of the battery gauge shown in FIG. 1.
Figure 3:
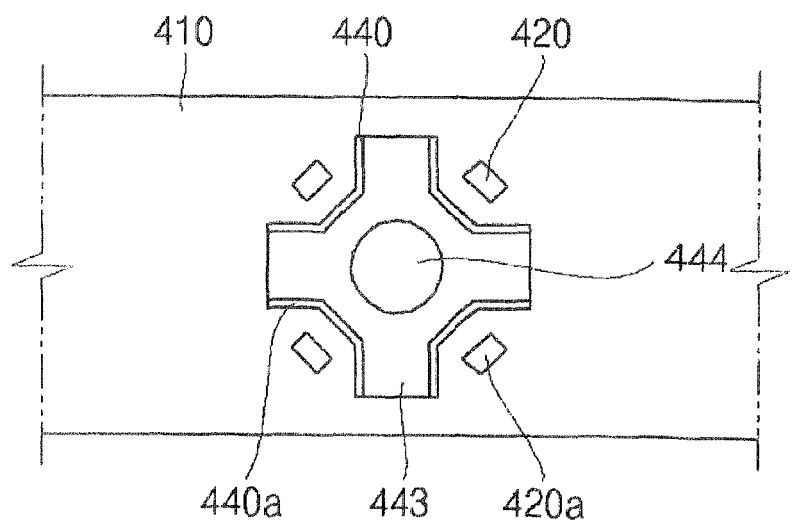
FIG. 3 illustrates a plan view of the principal part of the battery gauge of FIG. 1.
Figure 4:
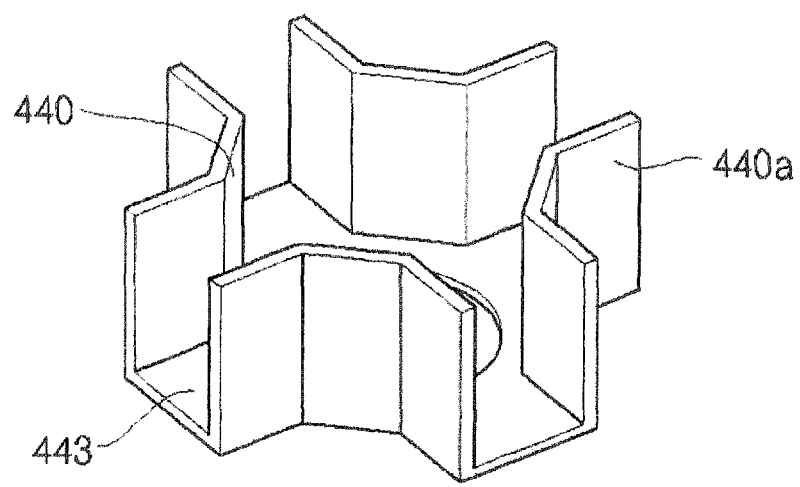
FIG. 4 illustrates a perspective view of partition walls illustrated in FIG. 2.

FIG. 1 illustrates a perspective view of a battery pack including a battery gauge according to an embodiment. FIG. 2 illustrates a cross-sectional view of a principal part of the battery gauge illustrated in FIG. 1. FIG. 3 illustrates a plan view of the principal part of the battery gauge illustrated in FIG. 1. FIG. 4 illustrates a perspective view of partition walls illustrated in FIG. 2.

Referring to FIGS. 1 to 4, a battery pack according to an exemplary embodiment includes at least one rechargeable battery cell 100, a protective circuit module 200 electrically connected to the battery cell 100, a pack case 300 accommodating the battery cell 100 and the protective circuit module 200, and a battery gauge 400.

In one embodiment, the battery cell 100 is a related art rechargeable battery that may be one of prismatic type batteries, cylinder type batteries, and pouch type batteries, but the present invention is not limited thereto. The battery cell 100 may be provided in plurality and connected in series and/or in parallel, but the present invention is not limited thereto.

Although not shown, the protective circuit module 200, electrically connected to the battery cell 100, may include a positive temperature coefficient (PTC) thermistor, a protective circuit unit, and a charge/discharge terminal that are disposed on a substrate. The PTC thermistor is configured to shut off electrical connection between the protective circuit module 200 and the battery cell 100 when temperature is excessively increased, or a current is excessively applied. A passive device such as a resistor and a condenser, an active device such as a field effect transistor, and an integrated circuit are selectively disposed at the protective circuit unit. When the battery cell 100 is charged, discharged, or overheated or when an excessive current is applied to the battery cell 100, the protective circuit unit shuts off a charge/discharge path of the battery cell 100 to prevent life cycle deterioration, overheating and explosion of the battery cell 100. The charge/discharge terminal, contacting a terminal of an external device, is configured to perform a charge/discharge operation through the external device.

The pack case 300 includes the battery cell 100, the protective circuit module 200, and a portion of the battery gauge 400 therein. Although the pack case 300 has an approximate hexahedron shape, the shape of the pack case 300 may be varied according to the shape of a relevant electronic device.

The battery gauge 400 includes a circuit board 410, a plurality of light emitting devices 420, a display unit 430, and partition walls 440. The circuit board 410, plurality of light emitting devices 420, and partition walls 440 may be contained within the pack case 300. The display unit 430 may be disposed on the pack case 300.

The light emitting devices 420, fixed to the circuit board 410, may include a control unit (not shown) that controls the light emitting devices 420 to be turned off or on according to a voltage.

As is well known in the art, the control unit turns the light emitting devices 420 on or off according to a battery discharge level of the battery cell 100. For example, the control unit turning the light emitting devices 420 on or off according to a voltage may be disposed on the circuit board 410 such that a reference voltage is compared with a current voltage to turn the light emitting devices 420 on or off corresponding to the current voltage. Since this technology is well known it the art, a detailed description thereof will be omitted.

A switch 411 is disposed at the circuit board 410. When the switch 411 is turned on, the light emitting devices 420 are turned on or off according to a voltage of the battery cell 100. In this case, the upper end of the switch 411 may be exposed outside the pack case 300 to conveniently use the switch 411.

The circuit board 410 may be directly and electrically connected to the battery cell 100, so that the light emitting devices 420 are electrically connected to the battery cell 100. Alternatively, the circuit board 410 may be electrically connected to the protective circuit module 200, so that the light emitting devices 420 are electrically connected to the battery cell 100 through the protective circuit module 200. The electrical connection between the circuit board 410 and the protective circuit module 200 or the electrical connection between the circuit board 410 and the battery cell 100 is conveniently performed through a conductive wire member or an electric wire member according to a related art operation such as welding. However, the type of a conductive wire member or an electric wire member is not limited for electrically connecting the circuit board 410 to the protective circuit module 200 or the circuit board 410 to the battery cell 100.

The light emitting devices 420 are arrayed on the circuit board 410, and are turned on or off according to a voltage of the battery cell 100, so that a current battery discharge level can be detected through the display unit 430. The light emitting device 420 may be one of a light emitting diode (LED), an organic electro luminance (EL), a lamp, and an equivalent thereof, but the present invention is not limited thereto.

The light emitting devices 420 may be arrayed in various shapes. Particularly, at least three light emitting devices 420 may be fixed at corners of a polygon. For example, when the number of the light emitting devices 420 is four, the light emitting devices 420 are respectively fixed to corners of a tetragon as illustrated in FIG. 3. Alternatively, when the number of the light emitting devices 420 is five, the light emitting devices 420 may be respectively fixed to corners of a pentagon (not shown).

The display unit 430 is disposed at positions corresponding to the light emitting devices 420 at the pack case 300, so as to display light of the light emitting devices 420 out of the pack case 300. Accordingly, a user can easily perceive a current battery discharge level through the display unit 430. The display unit 430 may include a transparent or translucent window, so that a user can conveniently perceive an on or off state of the light emitting device 420.

The shape of the display unit 430 may be varied according to the types of the light emitting devices 420 arrayed on the circuit board 410. For example, when the light emitting devices 420 are arrayed at the four corners of a tetragon, the display unit 430 may have four parts arrayed in a doughnut shape as illustrated in FIG. 1. Alternatively, when the light emitting devices 420 are arrayed at the four corners of a tetragon, a tetragonal switch (not shown) may be disposed in the center of the display unit 430, and the entire display unit 430 may be disposed in a tetragonal shape around the tetragonal switch. However, the shape of the display unit 430 is not limited thereto.

The display unit 430 is provided by simply fixing the display unit 430 through an insertion hole that has a shape corresponding to the display unit 430 and that is disposed in the pack case 300. The display unit 430 is fixed through adhesive, an adhesive tape, or one of various well known adhering methods. The display unit 430 may be easily formed of synthetic resin through an injection molding process. As illustrated in FIG. 2, the upper end of the display unit 430 may be exposed outside the pack case 300 such that a user easily perceives a battery discharge level.

The partition walls 440 guide light emitted from the light emitting devices 420 to the parts of the display unit 430 corresponding to the light emitting devices 420. Particularly, when the light emitting devices 420 are arrayed, the partition walls 440 guide light of the light emitting devices 420 to the corresponding part of the display unit 430 without affecting a neighboring off-state light emitting device 420*a* of the light emitting devices 420. Thus, an on/off operation of the light emitting device 420 is accurately displayed along the partition walls 440 to the corresponding part of display unit 430, so that a user can accurately detect a battery discharge level.

The partition wall 440 has a first end 441 fixed onto the circuit board 410, and a second end 442 protruding to the display unit 430, as illustrated in FIG. 2. The second end 442 may be spaced apart from the display unit 430 as illustrated in FIG. 2, or be in contact with the display unit 430. When the second end 442 is in contact with the display unit 430, light of the light emitting device 420 is completely prevented from affecting the part of the display unit 430 corresponding to the neighboring off-state light emitting device 420*a*. Thus, the on/off operation of the light emitting device 420 can be more accurately displayed on the display unit 430.

The partition wall 440 may be disposed between the light emitting device 420 and the neighboring light emitting device 420*a* to minimize the interference of light from the light emitting devices 420.

The structures and shapes of the partition walls 440 may be varied according to the number and arrangement of the light emitting devices 420. For example, the partition wall 440 may be connected to a neighboring partition wall 440*a* of the partition walls 440 through a plate 443 to form a single piece as illustrated in FIG. 4. Although not shown, the partition walls 440 may be separated from each other. In this case, each of the partition walls 440 should be fixed between the separated light emitting device 420 and the neighboring light emitting device 420*a*. However, when the partition wall 440 is connected to the neighboring partition wall 440*a* through the plate 443, the partition walls 440 can be fixed at one time by fixing the plate 443, and handling of the partition walls 440 is convenient. A through hole 444 may be disposed in the plate 443, and the switch 411 is connected to the circuit board 410 through the through hole 444.

The partition wall 440 may be disposed between the light emitting device 420 and the neighboring light emitting device 420*a*, and a part of the partition walls 440 without the light emitting device 420 may be open. For example, the partition wall 440 may have an arc shape with an open rear side as illustrated in FIG. 3. Alternatively, the partition walls 440 may have a cross section that is parallel to the circuit board 410 and that includes a straight line, an arc with an open portion, or a polygon with an open portion. In this case, the amount of material used for forming the partition walls 440 can be reduced. As such, the shapes of the partition walls 440 may be varied.

The partition walls 440 are easily formed through injection molding. When considering costs, handling and fixing of the partition walls 440, the partition walls 440 may be formed of synthetic resin. Synthetic resin used for the partition walls 440 may be acryl, poly ethylene terephthalate (PET), or polycarbonate (PC), but the present invention is not limited thereto. As is well known in the art, the partition walls 440 may be formed of metal.

A method of fixing the partition walls 440 to the circuit board 410 may be varied according to the material of the partition walls 440. For example, when the partition walls 440 are formed of synthetic resin, the partition walls 440 may be fixed to the circuit board 410 through one of an adhesive, heat welding, an adhesive tape, and a screw member. However, when the partition walls 440 are formed of metal, the partition walls 440 may be fixed to the circuit board 410 through welding such as soldering, which is well known in the art.

Figure 5:
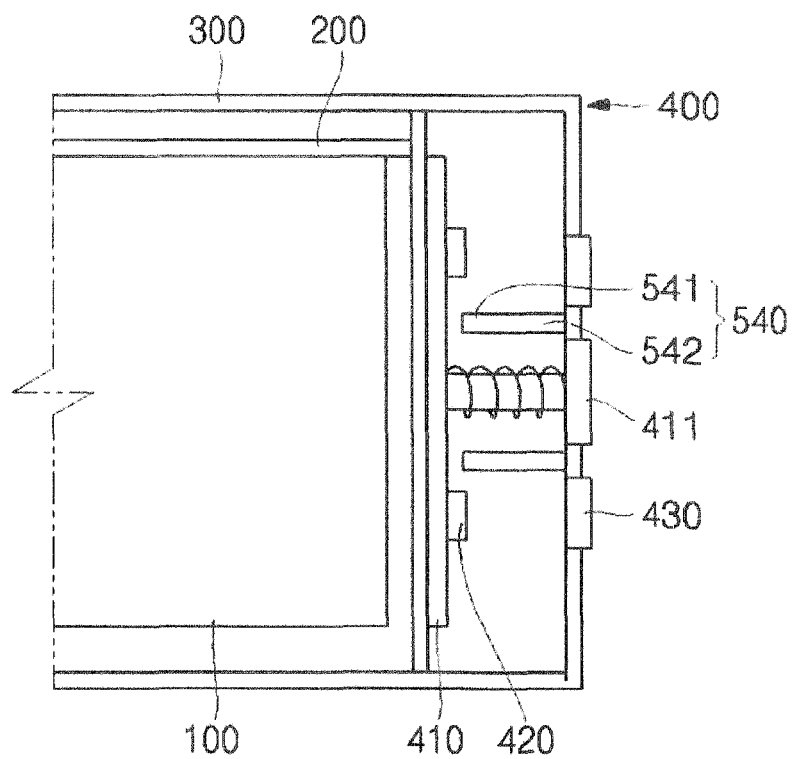
FIG. 5 illustrates a cross-sectional view of a principal part of a battery pack including a battery gauge, according to another embodiment.

Although the partition walls are fixed to the circuit board in the previous embodiment, a fixing position of the partition walls may be varied as follows. FIG. 5 illustrates a cross-sectional view of a principal part of a battery pack including a battery gauge, according to another embodiment.

Referring to FIG. 5, a battery gauge of a battery pack includes the circuit board 410, the light emitting devices 420, the display unit 430, and partition walls 540.

Since the present embodiment is the same as the previous embodiment in configuration except for a fixing position of the partition walls 540, a detailed description thereof will be omitted. Hereinafter, the fixing position of the partition walls 540 will now be described in detail.

The partition wall 540 has a first end 541 protruding to the circuit board 410, and a second end 542 fixed under the display unit 430. In this case, light from the light emitting devices 420 does not affect the neighboring off-state light emitting device 420a. Thus, the on/off operations of the light emitting devices 420 are accurately displayed through the display unit 430, so that a user can accurately detect a battery discharge level.

The first end 541 may be spaced apart from the circuit board 410 as illustrated in FIG. 5, or be in contact with the circuit board 410. When the first end 541 is in contact with the circuit board 410, light from the light emitting device 420 is completely prevented from affecting the part of the display unit 430 corresponding to the neighboring off-state light emitting device 420a. Thus, the on/off operations of the light emitting devices 420 can be more accurately displayed on the display unit 430, so that a user can more accurately detect a battery discharge level.

Figure 6:
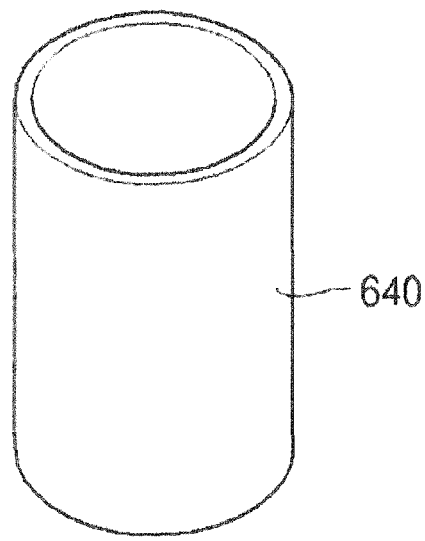
FIG. 6 illustrates a schematic view of a partition wall of a battery pack including a battery gauge, according to an embodiment.
Figure 7:
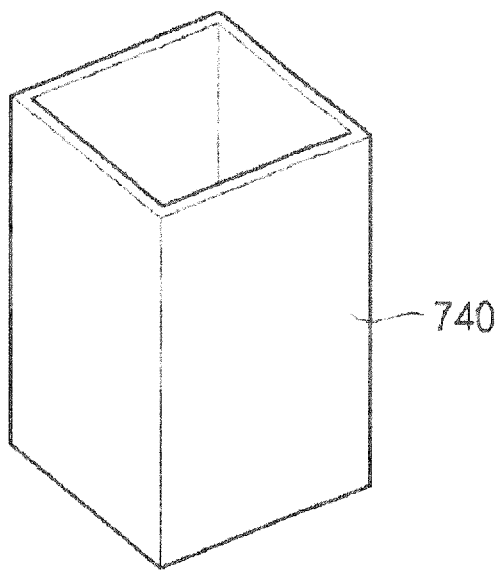
FIG. 7 illustrates a schematic view of a partition wall of a battery pack including a battery gauge, according to another embodiment.

The structure and shape of the partition wall according to the present invention may be varied. Hereinafter, the structure of a partition wall will now be described according to another embodiment. FIG. 6 illustrates a schematic view of a partition wall of a battery pack including a battery gauge, according to an embodiment. FIG. 7 illustrates a schematic view of a partition wall of a battery pack including a battery gauge, according to another embodiment.

Referring to FIGS. 6 and 7, partition walls 640 and 740 may surround light emitting devices. To this end, each of the partition walls 640 and 740 may include open upper and lower surfaces, or a guide hole (not shown) in the lower surface to transmit light from the light emitting device upward. Each of the partition walls 640 and 740 may have a cylindrical or hexahedron shape having open upper and lower surfaces, and a cross section of the partition walls 640 and 740 parallel to a circuit board may have one of various shapes including a circle and a tetragon.

When the partition walls 640 and 740 surround light emitting devices, light from the light emitting devices is displayed through corresponding parts of display units, so that light of the light emitting devices does not affect parts of the display units corresponding to neighboring off-state light emitting devices. Thus, on/off operations of the light emitting devices are more accurately displayed through the display units, and a user can more accurately perceive a battery discharge level.

The neighboring partition walls 640 may be separated from each other, or be connected to each other through a plate to form a single piece, as described above. The neighboring partition walls 740 may be separated from each other, or be connected to each other through a plate to form a single piece, as described above.

Figure 8:
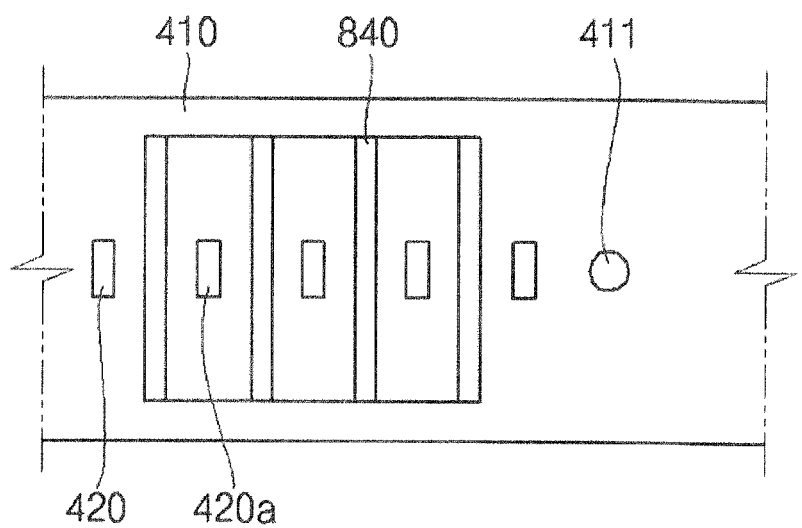
FIG. 8 illustrates a schematic view of a state where light emitting devices of a battery pack including a battery gauge are arranged, according to an embodiment.
Figure 9:
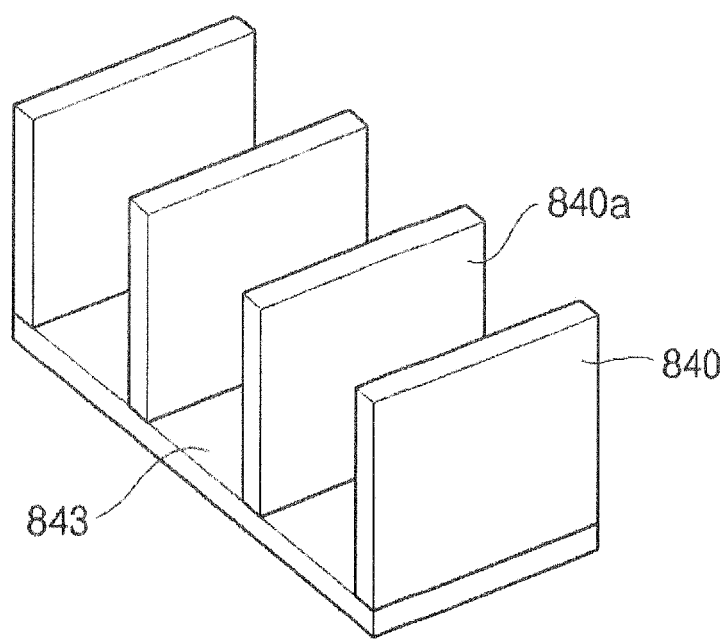
FIG. 9 illustrates a perspective view of partition walls of FIG. 8.

As described in the previous embodiment, the arrangement of partition walls may be varied. Hereinafter, the arrangement of partition walls will now be described according to another embodiment. FIG. 8 illustrates a schematic view of a state where light emitting devices of a battery pack including a battery gauge are arranged, according to an embodiment. FIG. 9 illustrates a perspective view of partition walls of FIG. 8.

Referring to FIGS. 8 and 9, the light emitting devices 420 may be fixed in a single row. That is, although at least three of the light emitting devices 420 are fixed at corners of a polygon in the previous embodiment, the light emitting devices 420 may be fixed in a single row according to the present embodiment. Since the present embodiment is the same as the previous embodiment in configuration except for the arrangement of the partition walls 540, a detailed description thereof will be omitted. Hereinafter, the arrangement of partition walls 840 will now be described in detail.

As described above, when the light emitting devices 420 are arranged in a single row, the partition wall 840 is disposed between the light emitting device 420 and the neighboring light emitting device 420a. The partition wall 840 may be connected to a neighboring partition wall 840a of the partition walls 840 through a plate 843 to form a single piece. When the partition wall 840 is connected to the neighboring partition wall 840a through the plate 843, a guide hole (not shown) may be disposed in the plate 843 to transmit light of the light emitting device 420 fixed onto the circuit board 410 to the upper side of the plate 843. Although not shown, parts constituting a display unit may be arrayed in a single row.

Even when the light emitting devices 420 are arrayed in a single row, the partition walls 840 prevent light of the light emitting devices 420 from affecting the part of the display unit corresponding to the neighboring off state light emitting device 420a. Thus, the on/off operations of the light emitting devices 420 can be accurately displayed through the corresponding parts of the display unit, and thus a user can accurately perceive a battery discharge level.

According to the embodiments, a battery pack includes a partition wall that prevents light of light emitting devices from affecting parts of a display unit corresponding to the neighboring off state light emitting devices. Thus, on/off operations of the light emitting devices can be accurately displayed through the corresponding parts of the display unit, and thus a user can accurately perceive a battery discharge level.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   at least one rechargeable battery cell;
   a protective circuit module electrically connected to the battery cell;
   a pack case accommodating the battery cell and the protective circuit module; and
   a battery gauge, the battery gauge comprises:
   a circuit board;
   a plate on the circuit board having an approximate + shape;
   a plurality of light emitting devices electrically connected to the battery cell on the circuit board and turned on or off according to a voltage of the battery cell;
   a display unit disposed outside the pack case at positions corresponding to the light emitting devices; and
   a plurality of partition wall guiding lights extending at 90 degrees from the plate, each of the plurality of partition wall guiding lights has three walls with a center wall attached to two outer walls at angles of greater than 90 degrees and less than 180 degrees,
   wherein the three walls of each of the plurality of partition wall guiding lights partially surrounds one of the plurality of light emitting devices,
   wherein the outer walls of adjacent partition wall guiding lights do not connect with any other structure except the plate and the center wall and form an open portion corresponding to a region without light emitting devices where extensions of the approximate + shaped plate exist.

2. The battery pack as claimed in claim 1, wherein the partition wall has an end fixed on the circuit board, and another end protruding to the display unit.

3. The battery pack as claimed in claim 1, wherein the partition wall has an end fixed on a lower side of the display unit, and another end protruding to the circuit board.

4. The battery pack as claimed in claim 1, wherein the partition wall is connected to a neighboring partition wall through a plate to form a single piece.

5. The battery pack as claimed in claim 4, wherein the plate comprises a through hole.

6. The battery pack as claimed in claim 1, wherein the partition wall is separated from a neighboring partition wall.

7. The battery pack as claimed in claim 1, wherein the partition wall is disposed between neighboring light emitting devices of the light emitting devices.

8. The battery pack as claimed in claim 2, wherein the partition wall is fixed through one of an adhesive, heat welding, an adhesive tape, and a screw member.

9. The battery pack as claimed in claim 1, wherein the circuit board comprises a switch, and the battery gauge turns the light emitting device on or off according to a voltage of the battery cell when the switch is turned on.

10. The battery pack as claimed in claim 1, wherein the switch has an upper end exposed outside the pack case.

11. The battery pack as claimed in claim 1, wherein the circuit board is electrically connected to the protective circuit module, so that the circuit board is electrically connected to the battery cell.

12. The battery pack as claimed in claim 3, wherein the partition wall is fixed through one of an adhesive, heat welding, an adhesive tape, and a screw member.

* * * * *